US012496598B2

(12) United States Patent
Stegmann et al.

(10) Patent No.: US 12,496,598 B2
(45) Date of Patent: Dec. 16, 2025

(54) SWIRL SEAT NOZZLE

(71) Applicant: Cummins Inc., Columbus, IN (US)

(72) Inventors: Heico Stegmann, Reichenberg (DE); Mathew J. Lloyd, Leeds (GB); Lukas Kaufmann, Tiefenthal (DE); Robert L Holroyd, Halifax (GB)

(73) Assignee: Cummins Inc., Columbus, IN (US)

(*) Notice: Subject to any disclaimer, the term of this patent is extended or adjusted under 35 U.S.C. 154(b) by 517 days.

(21) Appl. No.: 17/433,626

(22) PCT Filed: Feb. 21, 2020

(86) PCT No.: PCT/US2020/019260
§ 371 (c)(1),
(2) Date: Aug. 25, 2021

(87) PCT Pub. No.: WO2020/176350
PCT Pub. Date: Sep. 3, 2020

(65) Prior Publication Data
US 2022/0143633 A1 May 12, 2022

Related U.S. Application Data

(60) Provisional application No. 62/809,947, filed on Feb. 25, 2019.

(51) Int. Cl.
*F02M 61/16* (2006.01)
*B05B 1/30* (2006.01)
*B05B 1/34* (2006.01)

(52) U.S. Cl.
CPC .......... *B05B 1/3468* (2013.01); *B05B 1/3046* (2013.01); *F02M 61/162* (2013.01)

(58) Field of Classification Search
CPC ..... B05B 1/341; B05B 1/3421; B05B 1/3426; B05B 1/3431; B05B 1/3442;
(Continued)

(56) References Cited

U.S. PATENT DOCUMENTS 1,194,051 A * 8/1916 Mejani .................. B05B 1/3033 239/485
4,406,404 A 9/1983 Horino et al.
(Continued)

FOREIGN PATENT DOCUMENTS

CN 103362712 A 10/2013

OTHER PUBLICATIONS

International Search Report and Written Opinion issued by the ISA/US, Commissioner for Patents, dated May 22, 2020, for International Application No. PCT/US2020/019260; 8 pages.
(Continued)

*Primary Examiner* — Jason J Boeckmann
(74) *Attorney, Agent, or Firm* — Faegre Drinker Biddle & Reath LLP

(57) ABSTRACT

An injector is provided, comprising: a valve seat having a needle opening extending from an upper surface along a longitudinal axis and terminating at a seating surface configured to mate with a valve needle to control flow of fluid through the injector, and a nozzle plate. The valve seat further comprises a plurality of drillings and a corresponding plurality of swirl channels, each of the plurality of drillings being in flow communication with the needle opening and a swirl channel. Each of the swirl channels directs flow of fluid from one of the drillings toward the longitudinal axis into a central swirl chamber. The nozzle plate includes a substantially flat upper surface that engages the valve seat lower surface and includes an opening in flow communication with a metering orifice, the opening being aligned with the central swirl chamber when the nozzle plate is attached to the valve seat.

6 Claims, 11 Drawing Sheets

(58) Field of Classification Search
CPC ... B05B 1/3447; B05B 1/3452; B05B 1/3468; B05B 1/3478; B05B 1/3494; F02M 1/162; F02M 1/163
USPC ............................................ 239/463, 533.12
See application file for complete search history.

(56) References Cited

U.S. PATENT DOCUMENTS

| | | | | |
|---|---|---|---|---|
| 4,566,634 | A | 1/1986 | Wiegand | |
| 5,570,841 | A | 11/1996 | Pace et al. | |
| 5,933,700 | A | 8/1999 | Tilton | |
| 6,783,085 | B2 | 8/2004 | Xu | |
| 8,047,452 | B2 | 11/2011 | Martin | |
| 8,672,237 | B2 * | 3/2014 | Roush | B05B 7/0408 604/82 |
| 9,638,080 | B2 | 5/2017 | Cavanagh | |
| 2003/0132320 | A1 * | 7/2003 | Sebastian | F02M 61/1806 239/584 |
| 2004/0011895 | A1 | 1/2004 | Dantes et al. | |
| 2010/0314470 | A1 | 12/2010 | Cavanagh | |
| 2013/0256428 | A1 | 10/2013 | Okamoto et al. | |

OTHER PUBLICATIONS

Examination Report for GB Patent Application No. 2112438.3, mailed May 30, 2022.
International Preliminary Report on Patentability for International patent application No. PCT/US2020/019260, filed Feb. 21, 2020, mailed Aug. 25, 2021.

* cited by examiner

SWIRL SEAT NOZZLE

CROSS-REFERENCE TO RELATED APPLICATIONS

The present application is a national phase filing of International Application No. PCT/US2020/019260, filed Feb. 21, 2020 which claims priority to U.S. Provisional Application Ser. No. 62/809,947, entitled "SWIRL SEAT NOZZLE," filed on Feb. 25, 2019, the entire disclosures being expressly incorporated herein by reference.

FIELD OF THE DISCLOSURE

The present disclosure relates generally to fluid atomizers, and more specifically to dosing modules for spraying reductant into an exhaust stream of an aftertreatment system upstream of a catalyst chamber.

BACKGROUND

In various applications it is desirable to create fine droplets of a fluid when injecting the fluid into a chamber or passage. The basic function of such atomizers is to increase shear forces between the fluid and ambient gas. Injectors such as fuel injectors and reductant dosers are known which include structure for achieving this increased shear force. For example, some injectors include fluid passages that direct the flow of portions of the fluid toward the flow of other portions, creating turbulence at the intersection of the flows of fluid, which is also the location where the fluid is emitted from the injector. Other injectors include curved passages with one or more metering orifices at the end of the passages, wherein the curved shape of the passages impart rotational energy into the fluid, improving atomization of the fluid. Still other injectors include multiple fluid passages that intersect which are also formed in a curved or swirl shape. These injectors, however, typically use multiple plates to form the swirl passages which require alignment, complex machining and attachment to one another. At a minimum, such injectors require at least one component in addition to the valve seat component (which normally only turns on and shuts off the liquid flow) to provide the passages for imparting rotational energy to the fluid. This separation of components is generally a result of differences in the materials used to form the components and/or different manufacturing processes. Thus, such injectors generally require alignment between components and result in component stack up, complex machining, and increased cost. As such, an improved fluid atomizer design is needed.

SUMMARY

In one embodiment of the present disclosure, an injector is provided, comprising: a valve seat including a body having an upper surface, a lower surface, and a needle opening formed into the upper surface, the needle opening having at least one liquid passage and a needle bore sized to permit movement of a valve needle between a lowered position, wherein a lower end of the valve needle forms a seal with a seating surface in valve seat to prevent liquid from flowing out of the at least one liquid passage, and a raised position, wherein the lower end of the valve needle is spaced apart from the seating surface to permit liquid to flow out of the at least one liquid passage; and a nozzle plate including a body having an upper surface, a lower surface, and a metering orifice extending between the nozzle body upper surface and the nozzle body lower surface; wherein the valve seat body includes a plurality of drillings that extend at an angle relative to a longitudinal axis extending through the valve seat and the nozzle plate, the plurality of drillings having openings formed in the seating surface and being in flow communication with inlet portions of a plurality of swirl channels, the plurality of swirl channels being configured to deliver fluid from the plurality of drillings to a central swirl chamber in flow communication with the metering orifice, which delivers the fluid from the injector in the form of a spray. In one aspect of this embodiment, the plurality of swirl channels is formed into the lower surface of the valve seat. In a variant of this aspect, each of the plurality of swirl channels is defined by a wall that extends from an upper surface of the channel to the lower surface of the valve seat. In another variant, each of the plurality of swirl channels includes a milling extension to accommodate formation of a corresponding one of the plurality of drillings. In yet another variant of this aspect, each of the plurality of drillings is formed directly into a corresponding inlet portion of a corresponding one of the plurality of swirl channels. In still another variant, the upper surface of the nozzle plate is featureless except for an opening in flow communication with the metering orifice. In another aspect, the plurality of swirl channels is formed into the upper surface of the nozzle plate. In a variant of this aspect, one of the lower surface of the valve seat or the upper surface of the nozzle plate includes a registration post and another of the lower surface of the valve seat or the upper surface of the nozzle plate includes a registration bore configured to receive the registration bore to align the inlet portions of the plurality of swirl channels with the plurality of drillings of the valve seat. In yet another aspect of this embodiment, each of the plurality of swirl channels includes a curved portion in flow communication with the inlet portion and an outlet portion in flow communication with the curved portion and the central swirl chamber.

In another embodiment of the present disclosure, an injector is provided, comprising: a valve seat having an upper surface, a lower surface and a needle opening extending from the upper surface toward the lower surface along a longitudinal axis of the valve seat and terminating at a seating surface configured to mate with a valve needle to prevent flow of fluid from the needle opening when the valve needle is in a lowered position and to permit flow of fluid from the needle opening when the valve needle is in a raised position, the valve seat further comprising a plurality of drillings and a corresponding plurality of swirl channels, each of the plurality of drillings being in flow communication with the needle opening and a corresponding one of the plurality of swirl channels, each of the swirl channels directing flow of fluid from a corresponding one of the plurality of drillings toward the longitudinal axis into a central swirl chamber; and a nozzle plate including an upper surface, a lower surface, and a metering orifice extending between the nozzle plate upper surface and the nozzle plate lower surface, the upper surface being substantially flat and engaging the valve seat lower surface and including an opening in flow communication with the metering orifice, the opening being aligned with the central swirl chamber when the nozzle plate is attached to the valve seat. In one aspect of this embodiment, each of the plurality of swirl channels includes a curved portion in flow communication with an inlet portion and an outlet portion in flow communication with the curved portion and the central swirl chamber. In another aspect, the plurality of swirl channels is formed into the lower surface of the valve seat. In a variant of this aspect, each of the plurality of swirl channels is defined by a wall that extends from an upper surface of the channel to the lower surface of the valve seat. In a further variant, each of the plurality of swirl channels includes a milling extension to accommodate formation of a corresponding one of the plurality of drillings.

In yet another embodiment, the present disclosure provides a valve seat for an injector, comprising: a body having an upper surface, a lower surface, a needle opening extending into the body from the upper surface to a seating surface configured to mate with a valve needle to control flow of fluid through the valve seat, a plurality of drillings extending from the needle opening toward the lower surface and away from a longitudinal axis of the body, and a plurality of swirl channels formed into the lower surface, each swirl channel being in flow communication with a corresponding one of the plurality of drillings and a central swirl chamber. In one aspect of this embodiment, each of the swirl channels is defined by a wall that is substantially parallel to the longitudinal axis. In another aspect, the plurality of drillings extend from a lower portion of the seating surface. In yet another aspect, each of the swirl channels includes an inlet portion in flow communication with a corresponding one of the plurality of drillings, a curved body portion in flow communication with the inlet portion, and an outlet portion in flow communication with the central swirl channel.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The above-mentioned and other features and advantages of this disclosure, and the manner of obtaining them, will become more apparent, and will be better understood by reference to the following description of the exemplary embodiments taken in conjunction with the accompanying drawings, wherein.

Figure 1:
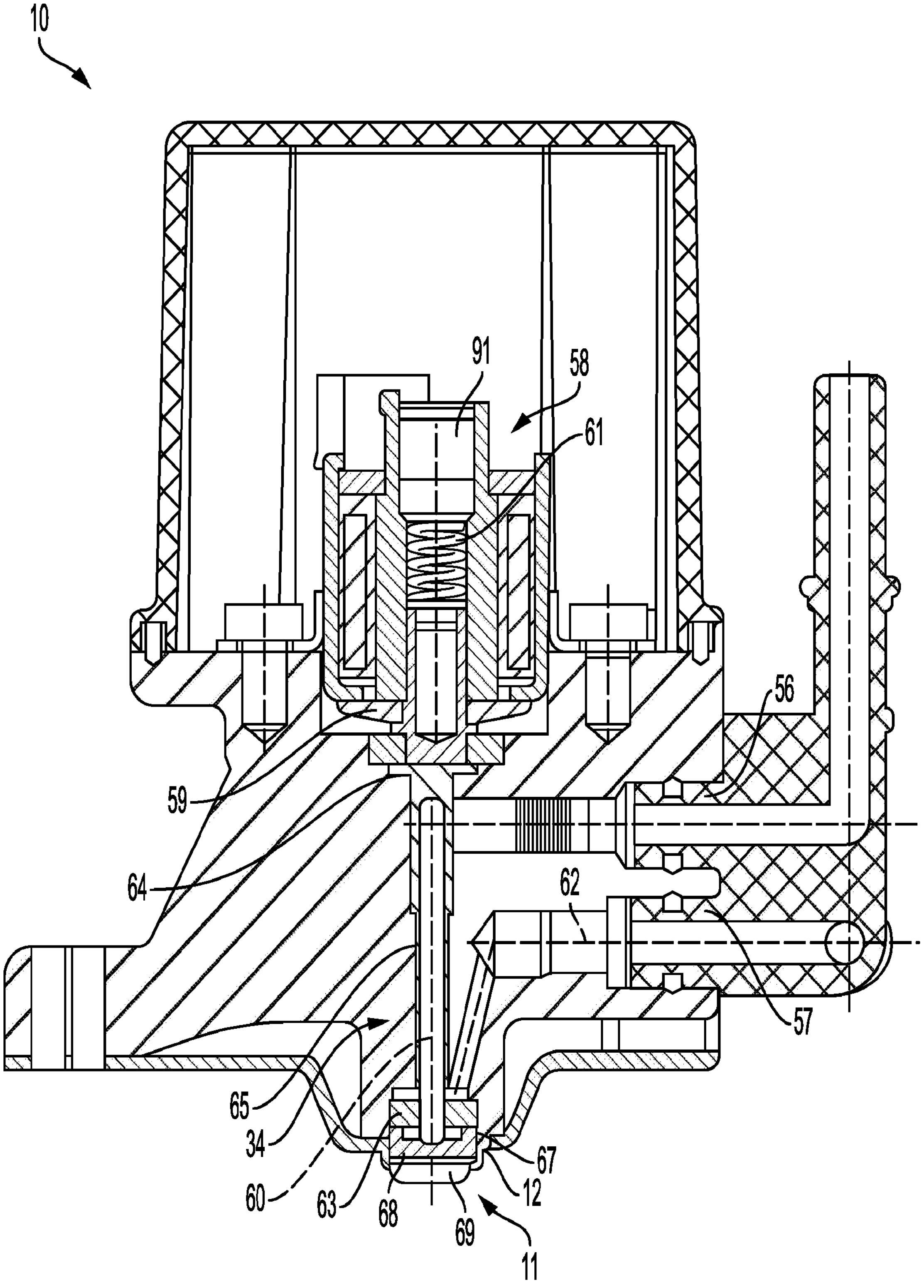
FIG. 1 PRIOR ART
FIG. 1 is a side cross-sectional view of a prior art reductant injector.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Various types of injectors are used in internal combustion engines. Some injectors inject fuel into a combustion chamber or into a port upstream of the combustion chamber. Other injectors inject water or air into fuel-air mixtures delivered to the combustion chamber of the engine. In diesel engines, injectors are also used to deliver diesel exhaust fluid (DEF) into a Selective Catalytic Reduction (SCR) system which converts nitrogen oxide (NOx) compounds into nitrogen, carbon dioxide or water for improved emissions performance. In some applications, the DEF is a reductant, such as an aqueous urea solution. The injectors described in the present disclosure are described as liquid reductant injectors, but the disclosure is not intended to be limited to reductant injector applications. Those skilled in the art with the benefit of the present disclosure may readily apply the teachings provided herein to any of a variety of injectors including those mentioned above.

As is known to those skilled in the art, thorough atomization of liquid reductant injected upstream of an SCR catalyst improves the evaporation, thermolysis and hydrolysis needed to form gaseous ammonia which reduces the undesirable NOx in the engine exhaust gas. Various approaches exist for improving atomization including reducing the volume of the reductant flow path as the reductant flows downstream through the injector to one or more injector nozzle openings and/or imparting rotational energy into the reductant flow using a swirl device to reduce the droplet size of the reductant at the nozzle opening. The exemplary embodiments described herein provide effective reductant atomization at the injector nozzle outlet through simplified designs for imparting rotational energy into the flow of reductant.

Turning now to FIG. 1, a prior art reductant injector or metering unit 10 is shown. Metering unit 10, and an exhaust-gas after treatment system in which it is used, is described in greater detail in U.S. Pat. No. 8,201,393, the entire contents of which being expressly incorporated herein by reference. Metering unit 10 comprises an electromagnetic metering valve 34 having an electromagnet 58 comprising an armature 59, which can compress a helical compression spring 61 against its spring force, such that the reductant pressure can slide a needle 60 into the open position. Helical compression spring 61 in this case bears against a threaded bolt 91, by means of which the bias of helical compression spring 61 can be set. If the electromagnet 58 is not energized, helical compression spring 61 presses needle 60 back against a valve seat 12, into a closed position. Needle 60 in this case is relatively long and guided, on one end, in a linear plain bearing 63. On the end, guidance is provided by a sealing membrane 64, which protects electromagnet 58 against the aggressive reductant. Provided between these two guides is a cooling channel 65, which closes the circuit between two metering unit connections 56, 57.

From one metering unit 57 that is realized as an intake, the reductant is routed via a filter sieve 62, through a plurality of recesses in linear plain bearing 63, to valve seat 12. If, when electromagnet 58 is in the energized state, the reductant is allowed to pass through a central opening in valve seat 12, the reductant is routed through an atomizing nozzle 11. This atomizing nozzle 11 is realized as a swirl nozzle, and comprises two nozzle discs 67, 68, which are placed over one another. Nozzle discs 67, 68 are tensioned against valve seat 12 by an outlet nozzle insert 69. Outlet nozzle insert 69 has an outletnot shown in greater detail that widens in the shape of a funnel. Owing to the shape of the openings (not shown) of the nozzle discs 67, 68, the outflowing reductant undergoes swirling, which atomizes the reductant as it emerges. The reductant is injected by nozzle 11 into a region of the exhaust-gas line that precedes a catalytic converter.

Figure 2:
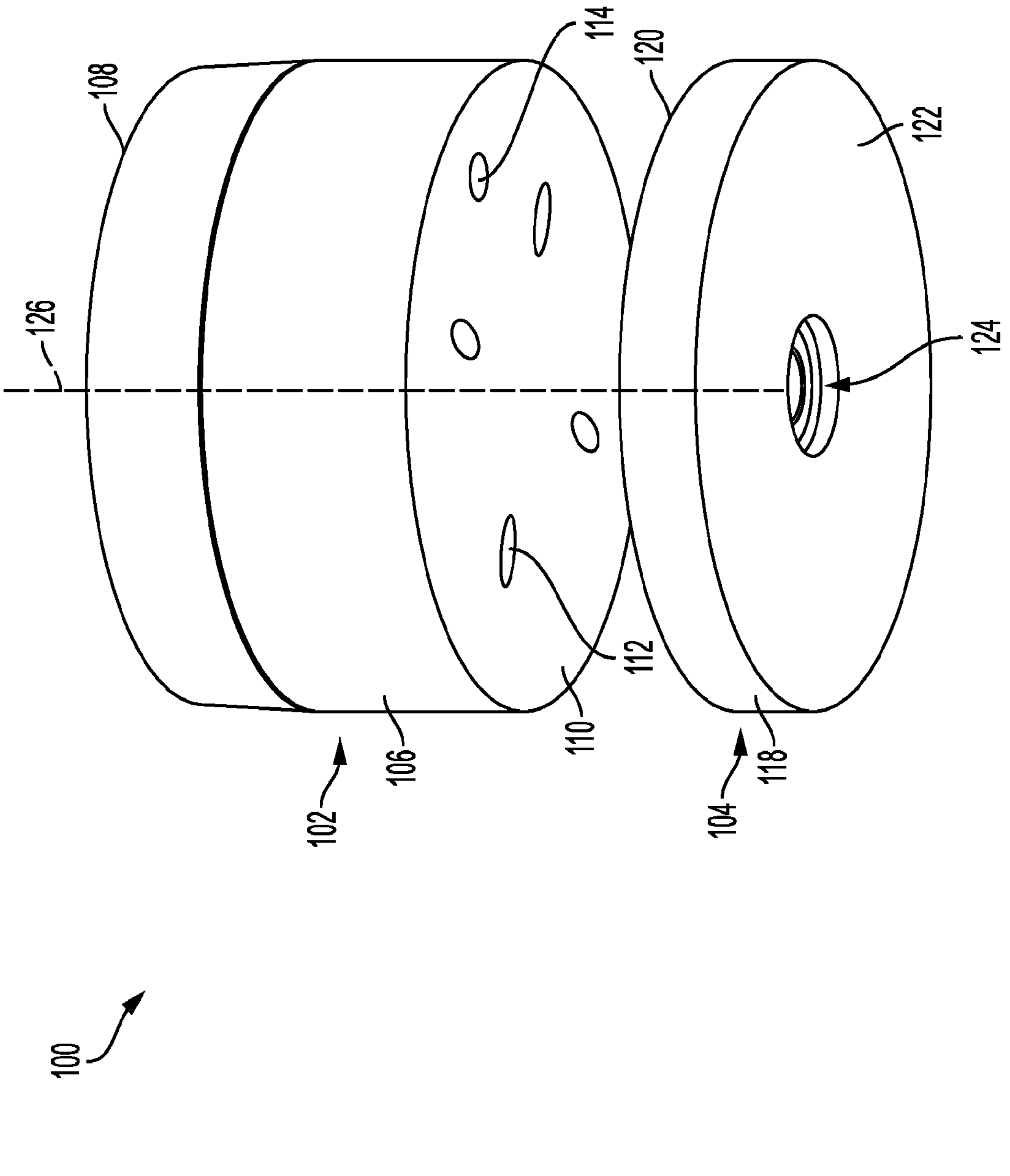
FIG. 2 is a perspective view of a valve seat assembly according to one embodiment of the present disclosure.

Turning now to FIG. 2, a first exemplary injector nozzle seat assembly 100 is shown. Nozzle seat assembly 100 generally includes a valve seat 102 and a nozzle plate 104. Valve seat 102 includes a generally cylindrical body 106 having a generally planar upper surface 108 and a generally planar lower surface 110. A plurality of fluid openings 112 are formed into lower surface 110 of valve seat 102 to deliver fluid to nozzle plate 104 as is further described below. A registration bore 114 is also formed into lower surface 110 and sized to receive a registration post 116 (FIG. 3) to ensure proper alignment of nozzle plate 104 with valve seat 102. Nozzle plate 104 includes a generally cylindrical body 118 having a generally planar upper surface 120 and a generally planar lower surface 122 with a metering orifice 124 extending between upper surface 120 and lower surface 122. When nozzle plate 104 is properly coupled to valve seat 102, a central, longitudinal axis 126 extends through nozzle seat assembly 100, passing through a center of valve seat 102 and a center of metering orifice 124. In the embodiments described herein, the valve seat and the nozzle plate may be coupled to one another using diffusion bonding to prevent internal leakage between the valve seat and the nozzle plate. In other embodiments, these components may be coupled together by clamping, welding or other suitable coupling technologies.

Figure 3:
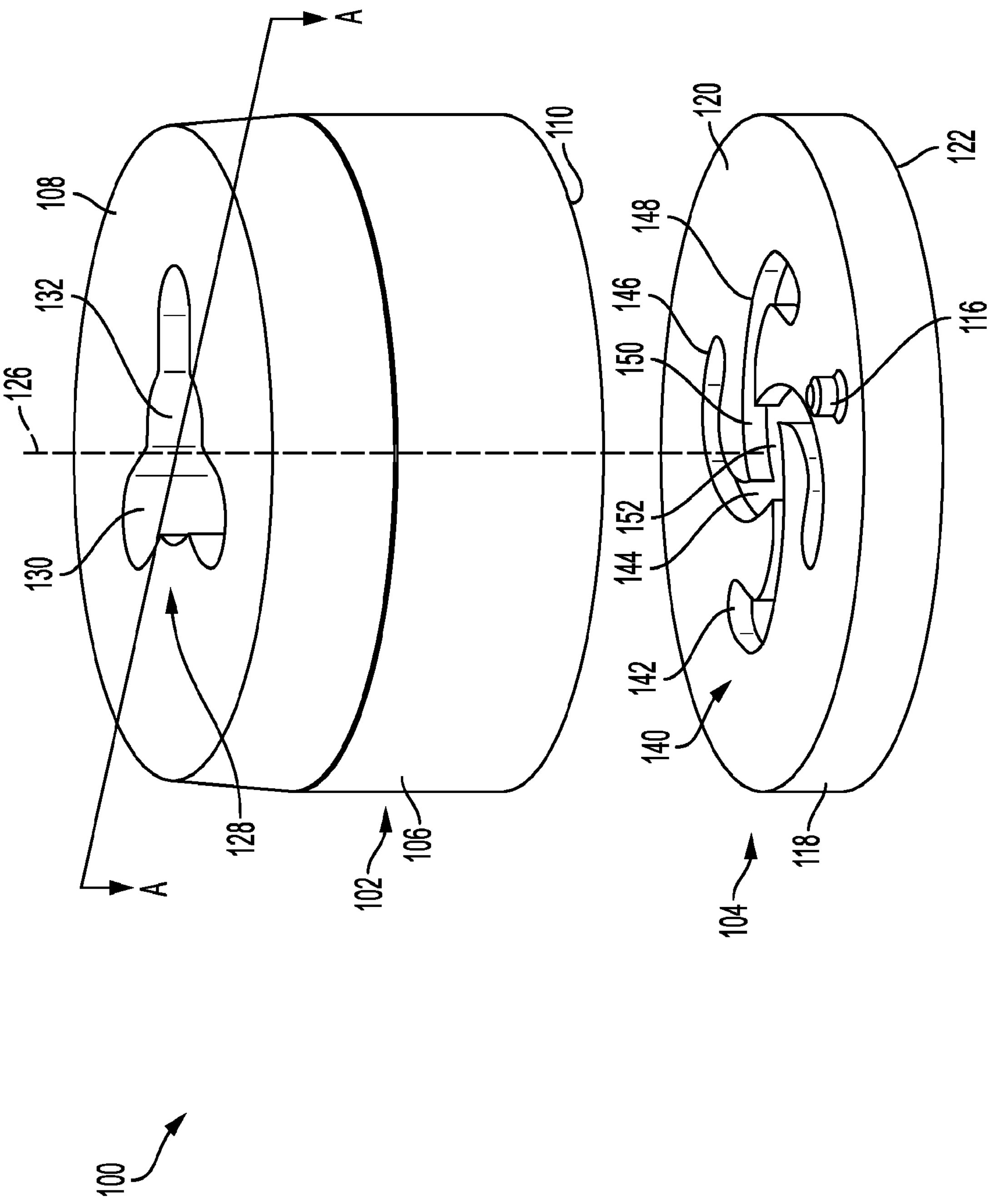
FIG. 3 is another perspective view of the valve seat assembly of FIG. 2.
Figure 4:
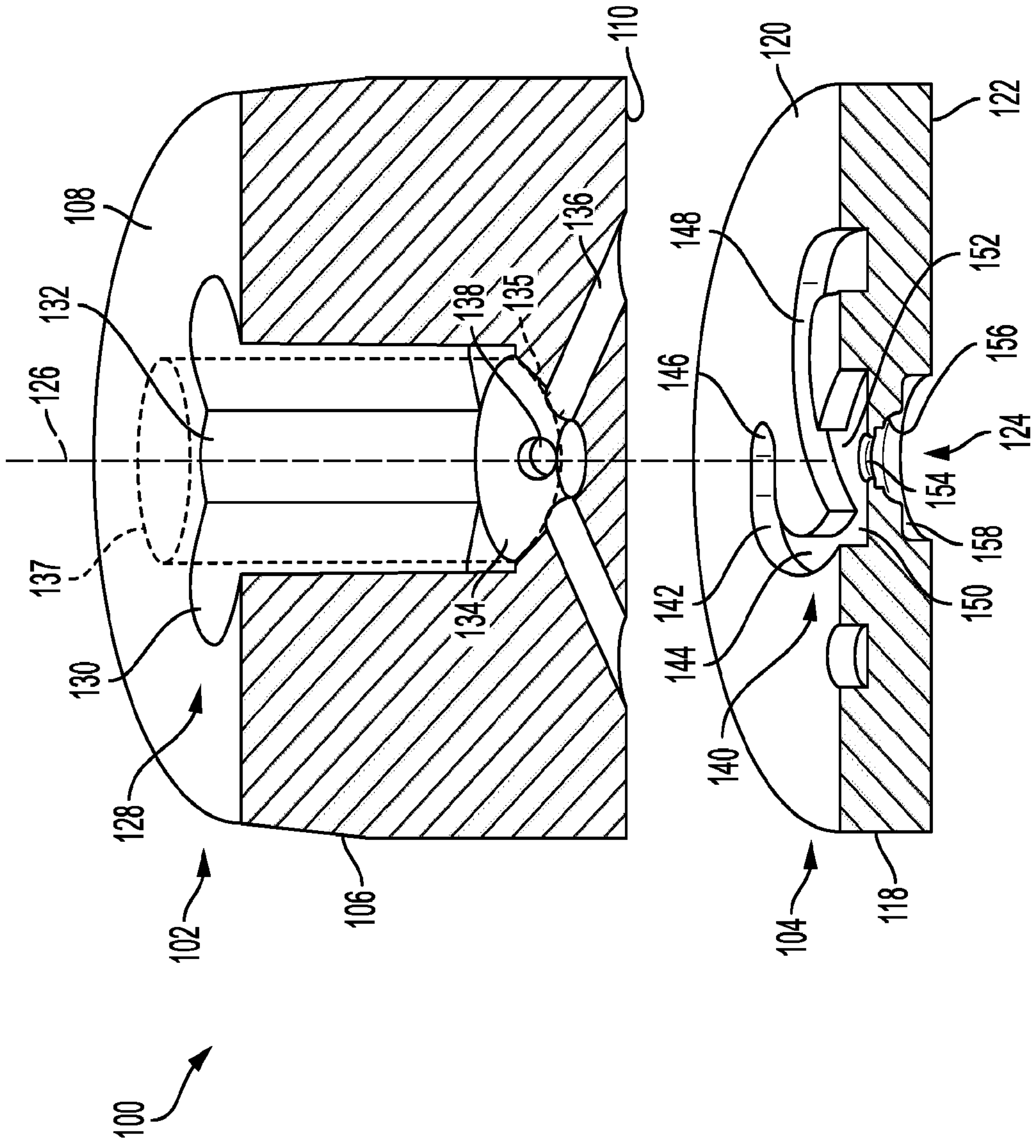
FIGS. 4 and 5 are perspective cross-sectional views of the valve seat assembly of FIG. 3 taken along lines A-A.
Figure 5:
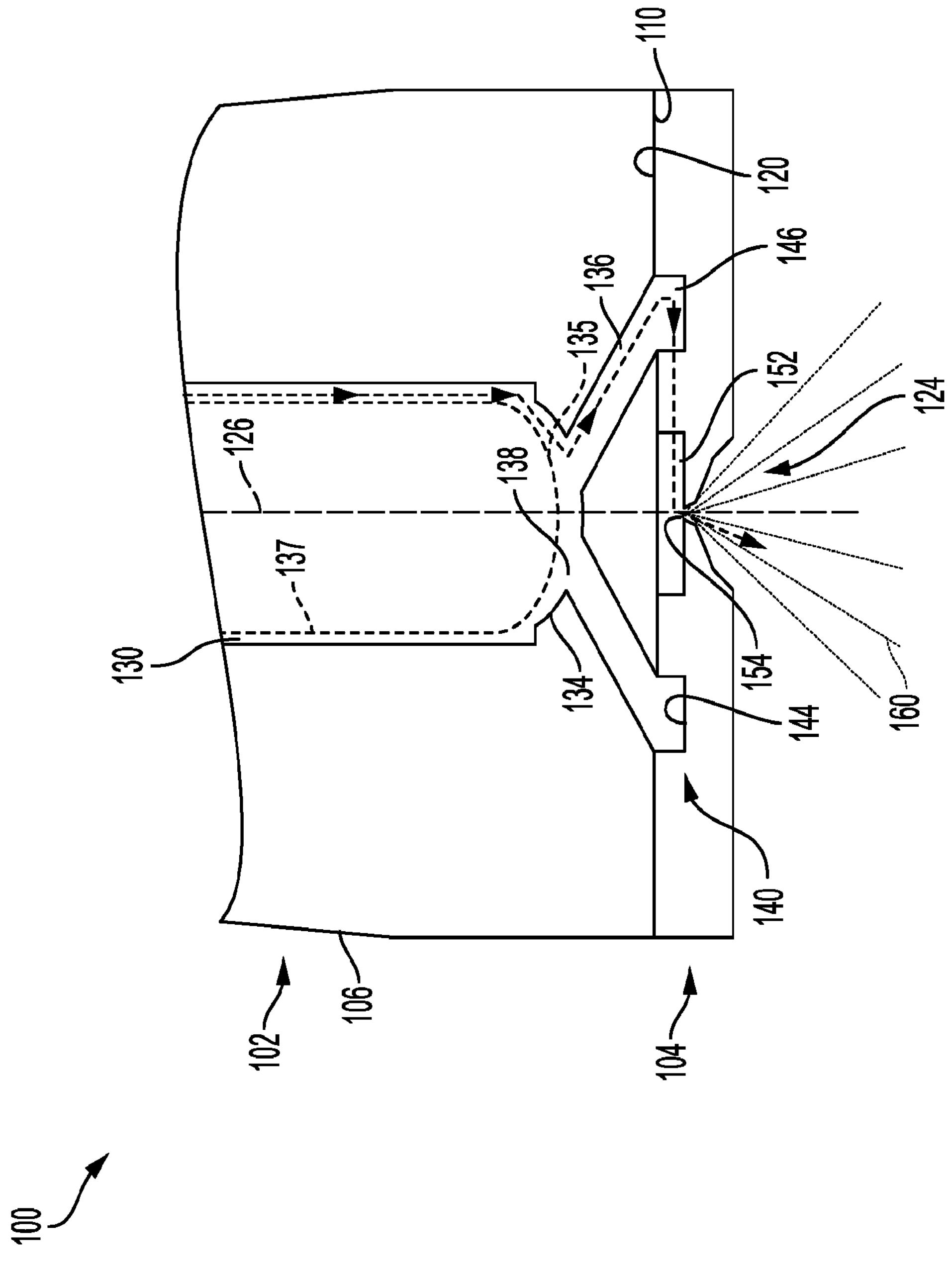

As shown in FIGS. 3-5, a needle opening 128 extends into body 106 of valve seat 102 along axis 126 from upper surface 108. Needle opening 128 includes a plurality of liquid passages 130 and a central needle bore 132. Passages 130 and needle bore 132 extend from upper surface 120 along longitudinal axis 126 toward lower surface 122, terminating at a substantially hemispherical seating surface 134. Seating surface 134 mates with a lower end 135 of valve needle 137 (shown in dashed lines). A plurality of drillings 136 extent at an angle relative to longitudinal axis 126 from openings 138 formed in seating surface 134 to lower surface 110 of valve seat 102.

In FIG. 4 valve needle 137 is shown in a lowered position wherein a seal is formed between seating surface 134 and lower end 135 of valve needle 137. When in this position, liquid in passages 130 is prevented from flowing into drillings 136 for delivery to nozzle plate 104. When valve needle 137 is moved to a raised position as shown in FIG. 5, fluid is delivered by nozzle assembly 100 in the manner described below.

Still referring to FIGS. 3 and 4, in this embodiment nozzle plate 104 includes a plurality of swirl channels generally designated 140. Each swirl channel 140 is recessed into upper surface 120 of nozzle plate 104 and defined by a wall 142 that extends from a lower surface 144 of the channel 140 to upper surface 120 of nozzle plate 104. In one embodiment, wall 142 is substantially parallel to longitudinal axis 126. Each swirl channel 140 includes an inlet portion 146, a curved body portion 148 and an outlet portion 150. Each outlet portion 150 is in flow communication with a central swirl chamber 152, which is in flow communication with metering orifice 124. As shown in FIGS. 4 and 5, metering orifice 124 includes an opening 154 formed in lower surface 144 of central swirl chamber 152, a generally conical surface 156 extending from opening 154, and an increased diameter outlet surface 158 that terminates at lower surface 122 of nozzle plate 104.

Referring now to FIG. 5, valve needle 137 is shown in the raised position such that lower end 135 is spaced apart from seating surface 134. As indicated by arrows in FIG. 5 representing the flow of fluid through nozzle seat assembly 100, when valve needle 137 is in the raised position, fluid flows downwardly through liquid passages 130, along seating surface 134, through openings 138, and into drillings 136. Fluid flows out of drillings 136 into inlet portions 146 of swirl channels 140, through curved body portions 148, and into central swirl chamber 152. Finally, fluid flows out of central swirl chamber 152 of nozzle plate 104 through opening 154 in the form of a spray indicated by numeral 160.

Referring now to FIGS. 6, 7, 8A, 8B and 9, an alternative embodiment of a valve seat assembly according to the present disclosure is shown. In the description of this embodiment, features that are the same as those described above with reference to valve seat assembly 100 are numbered using the same reference numerals, but incremented by 100. Nozzle seat assembly 200 generally includes a valve seat 202 and a nozzle plate 204. Valve seat 202 includes a generally cylindrical body 206 having a generally planar upper surface 208 and a generally planar lower surface 210. A plurality of fluid openings 212 are formed in valve seat 202 to deliver fluid to swirl channels as is further described below. Nozzle plate 204 includes a generally cylindrical body 218 having a generally planar upper surface 220, and a generally planar lower surface 222 with a metering orifice 224 extending between upper surface 220 and lower surface 222. When nozzle plate 204 is coupled to valve seat 202, a central, longitudinal axis 226 extends through nozzle seat assembly 200, passing through a center of valve seat 202 and a center of metering orifice 224.

Figure 6:
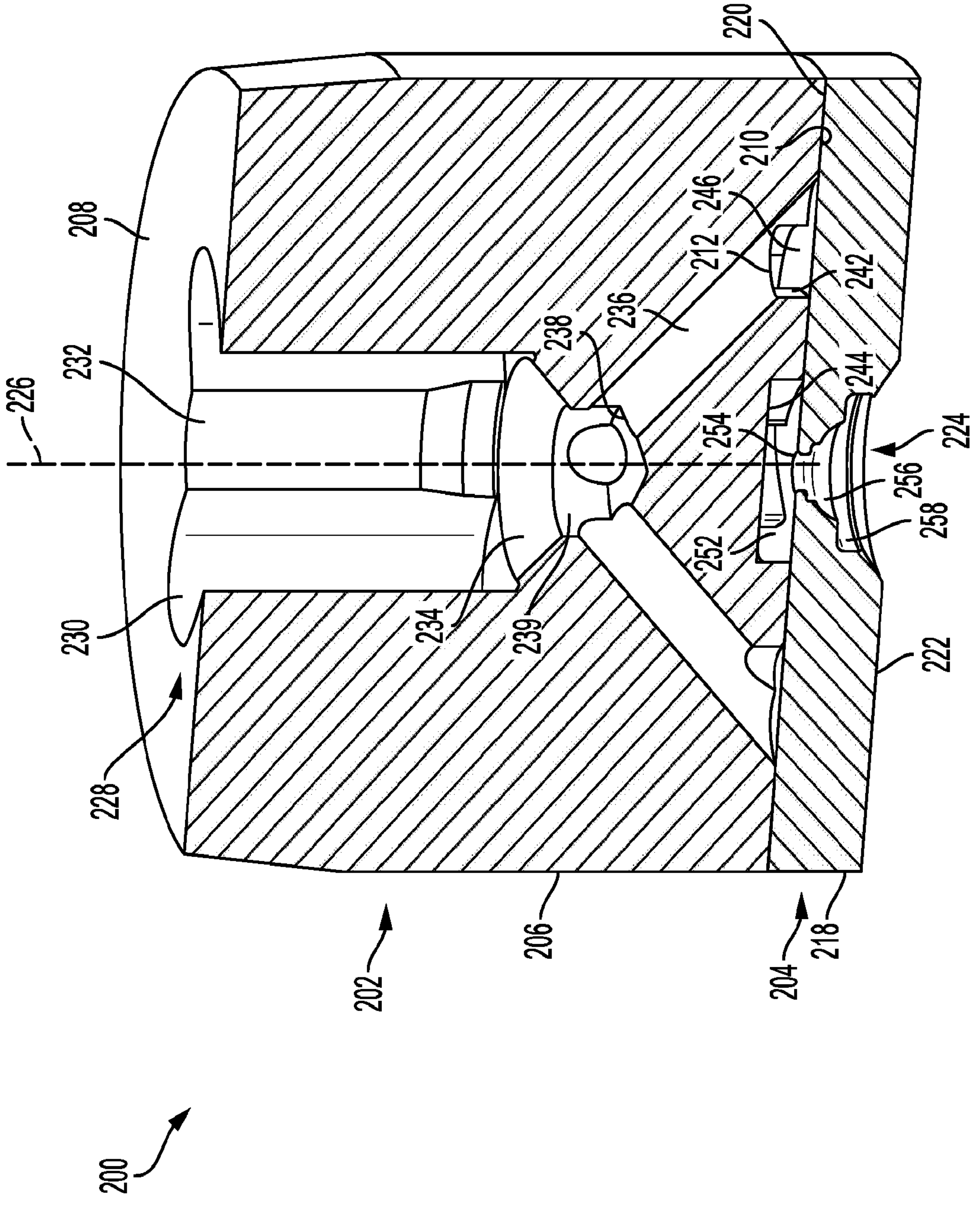
FIG. 6 is a perspective cross-sectional view of another embodiment of a valve seat assembly according to the teachings of the present disclosure.

As shown in FIG. 6, a needle opening 228 extends into body 206 of valve seat 202 along axis 226 from upper surface 208. Needle opening 228 includes a plurality of liquid passages 230 and a central needle bore 232. Passages 230 and needle bore 232 extend from upper surface 208 along longitudinal axis 226 toward lower surface 210, terminating at a substantially hemispherical seating surface 234. Seating surface 234 mates with a lower end of the valve needle (not shown) in the manner described above. A plurality of drillings 236 extent at an angle relative to longitudinal axis 226 from openings 238 formed in a lower section 239 of seating surface 234 toward lower surface 210 of valve seat 202.

As was described above with reference to valve seat assembly 100, when the valve needle is in a lowered position a seal is formed between seating surface 234 and the lower end of the valve needle. When in this position, liquid in passages 230 is prevented from flowing into drillings 236 for delivery to nozzle plate 204. When the valve needle is moved to a raised position, fluid is delivered by nozzle assembly 200 in the manner described below.

Unlike valve seat assembly 100, in valve seat assembly 200 the swirl channels 240 are formed in lower surface 210 of body 206 of valve seat 202 instead of on the upper surface of nozzle plate 204. More specifically and best shown in FIGS. 7 and 9, each swirl channel 240 is recessed into lower surface 210 of valve seat 202 and defined by a wall 242 that extends from an upper surface 244 of the channel 240 to lower surface 210 of valve seat 202. The lower boundary of swirl channels 240 is defined by upper surface 220 of nozzle plate 204. Wall 242 is substantially parallel to longitudinal axis 226. Each swirl channel 240 includes an inlet portion 246, a curved body portion 248 and an outlet portion 250. Each outlet portion 250 is in flow communication with a central swirl chamber 252, which is in flow communication with metering orifice 224 of nozzle plate 204. As shown in FIGS. 6, 8A and 8B, metering orifice 224 includes an opening 254 formed in upper surface 220 of nozzle plate 204, a generally conical surface 256 extending from opening 254, and an increased diameter outlet surface 258 that terminates at lower surface 222 of nozzle plate 204.

In the manner described above with reference to FIG. 5, when the valve needle is in the raised position such that the lower end is spaced apart from seating surface 234, fluid flows through nozzle seat assembly 200 downwardly through liquid passages 230, along seating surface 234, through openings 238, and into drillings 236. Fluid flows out of drillings 236 into inlet portions 246 of swirl channels 240, through curved body portions 248, and into central swirl chamber 252. Finally, fluid flows out of central swirl chamber 252 of valve seat 202 through opening 254 of nozzle plate 204 in the form of a spray.

Figure 7:
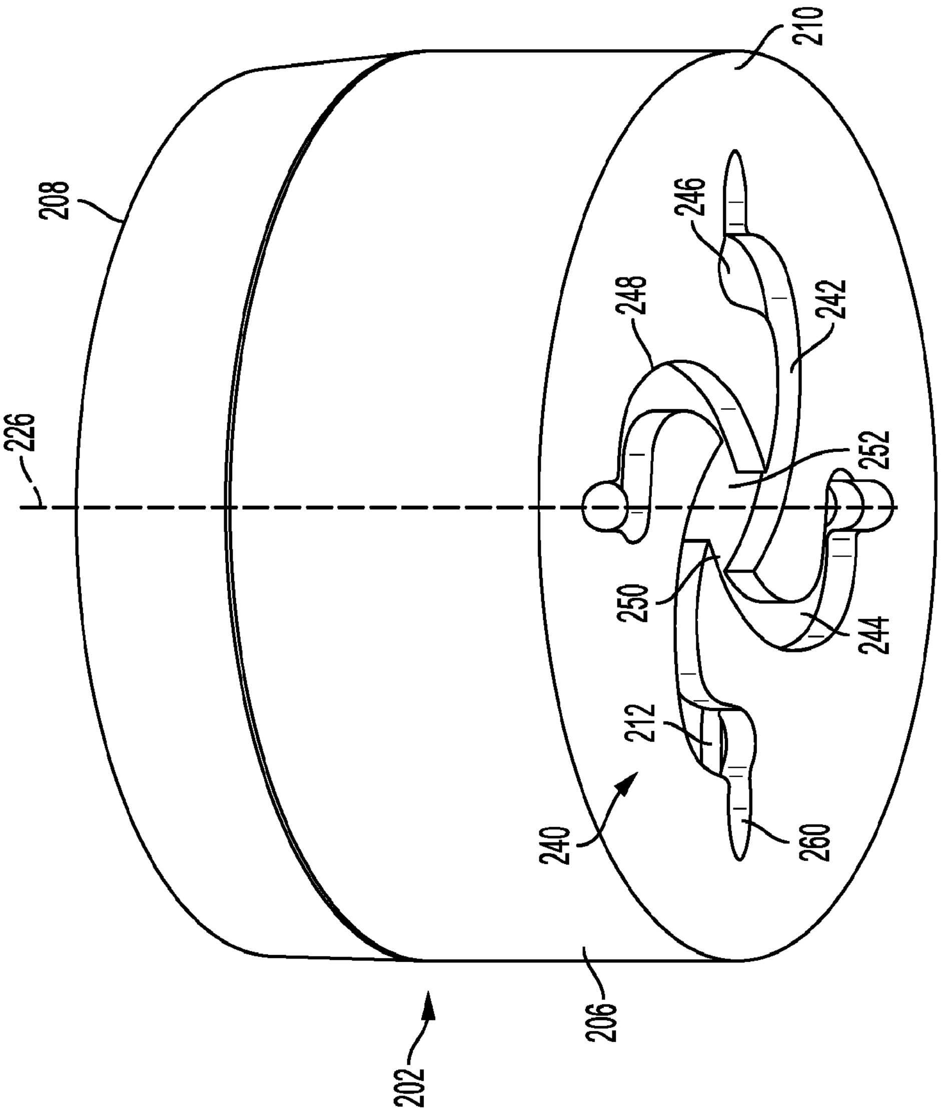
FIG. 7 is a perspective view of the valve seat of the valve seat assembly of FIG. 6.
Figure 8A:
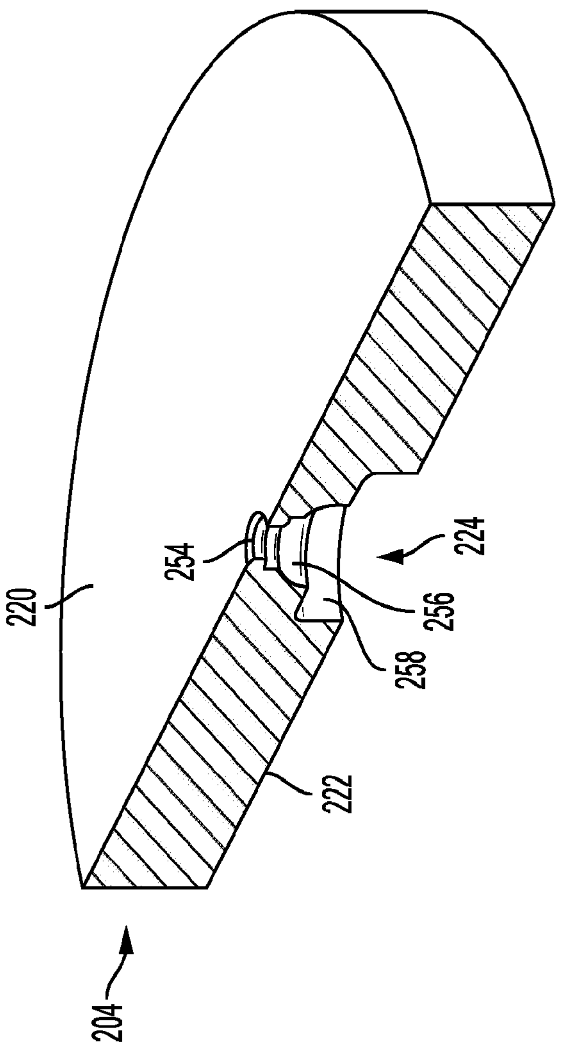
FIG. 8A is a perspective cross-sectional view of the nozzle plate of the valve seat assembly of FIG. 6.
Figure 8B:
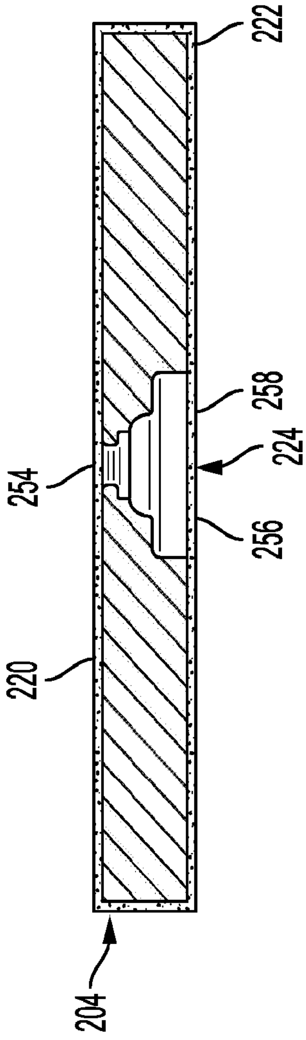
FIG. 8B is a side cross-sectional view of the nozzle plate of the valve seat assembly of FIG. 6.
Figure 9:
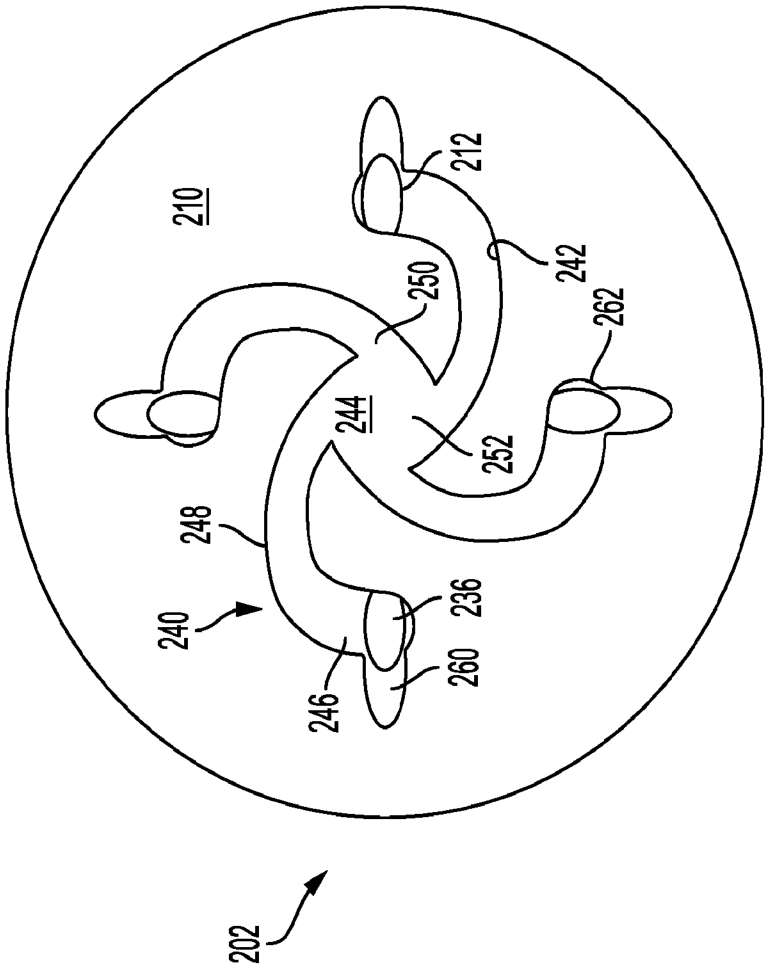
FIG. 9 is a bottom view of the valve seat of the valve seat assembly of FIG. 6.

As best shown in FIGS. 7 and 9, in one embodiment of valve seat 202 a milling extension 260 is formed in each swirl channel 240 to accommodate formation of drillings 236 which extend at a diagonal angle toward longitudinal axis 226. In an alternative embodiment of valve seat 202 depicted in FIG. 10A, swirl channels 240 are formed into lower surface 210 of valve seat 202 without milling extensions 260. Drillings 236 are formed directly into inlet portions 246 of swirl channels 240 in this embodiment. In both of the embodiments depicted in FIGS. 9 and 10A, swirl channels 240 are formed such that inlet portions 246 slightly overlap drillings 236 as indicated by overlap portion 262. In yet another embodiment of valve seat 202 depicted in FIG. 10B, which is very similar to the embodiment of FIG. 9, milling extensions 260 are formed in each swirl channel 240 but no overlap portion 262 is formed. Finally, another embodiment of valve seat 202 is depicted in FIG. 11. In this embodiment, no milling extension 260 and no overlap portion 262 is provided for inlet portions 246. In the embodiment of FIG. 10A, on the other hand, the risk of turbulence resulting from more liquid volume in swirl channels 240, especially in the area from drillings 236 to swirl channels 240, may be reduced by excluding milling extensions 260. This embodiment may, however, be more difficult to debur because of the two planes and edge resulting from inclusion of overlap portions 262. The embodiment of FIG. 11, which omits milling extensions 260 and overlap portions 262, may provide relatively easier deburring and less volume in swirl channels 240, resulting in less turbulence.

Figure 10B:
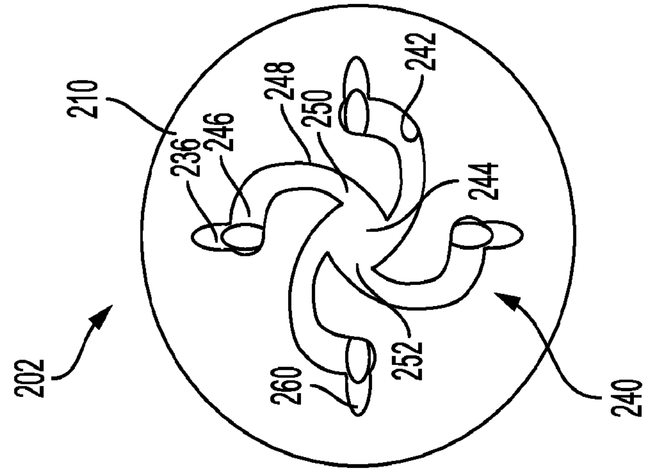
FIG. 10B is a bottom view of another alternative embodiment of a valve seat for use with the valve seat assembly of FIG. 6.
Figure 10A:
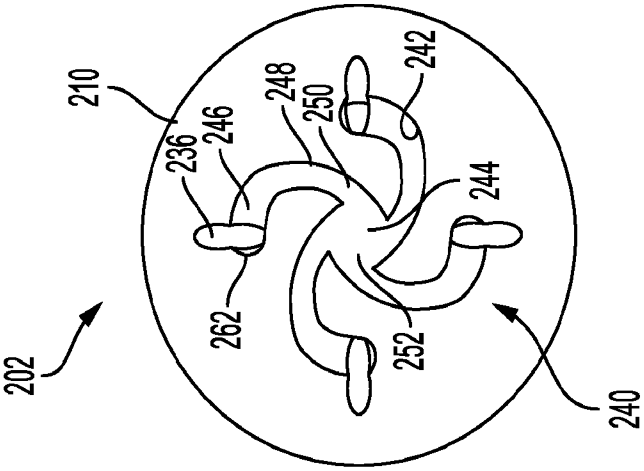
FIG. 10A is a bottom view of an alternative embodiment of a valve seat for use with the valve seat assembly of FIG. 6.
Figure 11:
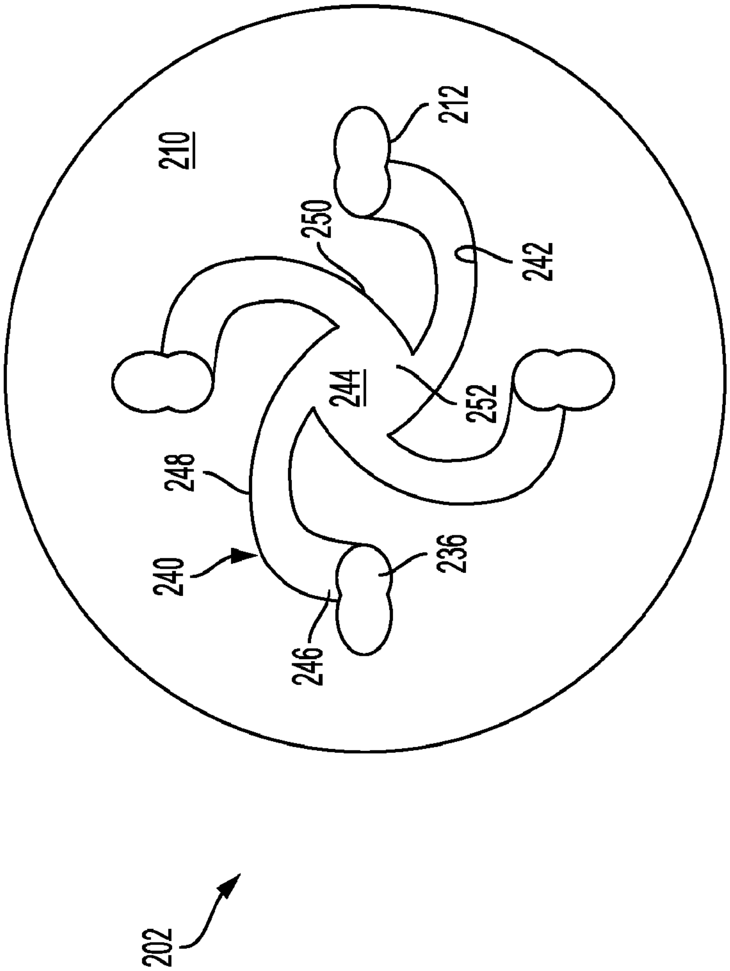
FIG. 11 is a bottom view of another alternative embodiment of a valve seat for use with the valve seat assembly of FIG. 6.

It should be understood that valve seats 202 of FIGS. 9 and 10B, which both include milling extensions 260, have two planes where an edge is formed at the outlet of drillings 236. This may be an advantage during the deburring process because only one tool is required.

Valve seat assembly 100 of FIGS. 2-5 provides fluid swirl and enhanced atomization without using multiple swirl plates. In this manner, the thickness of the nozzle portion of the assembly may be reduced and the assembly process may be simplified. Valve seat assembly 200 of FIGS. 6-10B provides similar fluid swirl and enhanced atomization without using multiple swirl plates. Moreover, by providing swirl channels 240 in lower surface 210 of valve seat 202, assembly 200 enables faster machining which may result in cost reduction. Additionally, machining is only required on lower surface 222 of nozzle plate 204 in assembly 200 whereas machining is required on both upper surface 120 and lower surface 122 of nozzle plate 104 in assembly 100. Also, as upper surface 220 of nozzle plate 204 is featureless except for opening 254 of metering orifice 224, nozzle plate 204 does not need to be aligned with valve seat 202 during assembly of valve seat assembly 200. As such, registration post 116 and registration bore 114 are eliminated. This permits machining upper surface 220 of nozzle plate 204 with improved flatness and surface finish.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. An injector, comprising:

a valve seat including a valve seat body having a valve seat upper surface, a valve seat lower surface, and a needle opening formed into the valve seat upper surface, the needle opening having at least one liquid passage and a needle bore sized to permit movement of a valve needle between a lowered position, wherein a lower end of the valve needle forms a seal with a seating surface in valve seat to prevent liquid from flowing out of the at least one liquid passage, and a raised position, wherein the lower end of the valve needle is spaced apart from the seating surface to permit liquid to flow out of the at least one liquid passage; and a nozzle plate including a nozzle body having a nozzle plate upper surface, a nozzle plate lower surface, and a metering orifice extending between the nozzle plate upper surface and the nozzle plate lower surface;

wherein the valve seat body includes a plurality of drillings, the plurality of drillings having openings formed in the seating surface and being in flow communication with inlet portions of a plurality of swirl channels, the plurality of swirl channels being configured to deliver fluid from the plurality of drillings to a central swirl chamber in flow communication with the metering orifice, which delivers the fluid from the injector in the form of a spray;

wherein the plurality of drillings extend at an angle relative to a longitudinal axis from the openings formed in the seating surface to the valve seat lower surface in a continuously linear path through the valve seat to the nozzle plate;

wherein the plurality of swirl channels is formed into the nozzle plate upper surface; and wherein one of the valve seat lower surface or the nozzle plate upper surface includes a registration post formed on a surface of the one of the valve seat lower surface or the nozzle plate upper surface, and another of the valve seat lower surface or the nozzle plate upper surface includes a registration bore configured to receive the registration bore to align the inlet portions of the plurality of swirl channels with the plurality of drillings of the valve seat.

2. The injector of claim 1, wherein each of the plurality of swirl channels includes a curved portion in flow communication with the inlet portion and an outlet portion in flow communication with the curved portion and the central swirl chamber.

3. The injector of claim 1, wherein each of the plurality of swirl channels comprises an inlet, a curved body portion, and an outlet; and wherein as a fluid flows out of the drilling into the inlets of each of the plurality of swirl channels, the fluid flows through each of the curved body portions and into the central swirl chamber.

4. The injector of claim 1, wherein each of the plurality of swirl channels is defined by a wall that extends from a lower surface of the swirl channel to the nozzle plate upper surface.

5. The injector of claim 1, wherein the needle bore and at least one liquid passage extend from the valve seat upper surface to the seating surface.

6. An injector, comprising:

a valve seat including a valve seat body having a valve seat upper surface, a valve seat lower surface, and a needle opening formed into the valve seat upper surface, the needle opening having at least one liquid passage and a needle bore sized to permit movement of a valve needle between a lowered position, wherein a lower end of the valve needle forms a seal with a seating surface in valve seat to prevent liquid from flowing out of the at least one liquid passage, and a raised position, wherein the lower end of the valve needle is spaced apart from the seating surface to permit liquid to flow out of the at least one liquid passage; and a nozzle plate including a nozzle body having a nozzle plate upper surface, a nozzle plate lower surface, and a metering orifice extending between the nozzle plate upper surface and the nozzle plate lower surface;

wherein the valve seat body includes a plurality of drillings, the plurality of drillings having openings formed in the seating surface and being in flow communication with inlet portions of a plurality of swirl channels, the plurality of swirl channels being configured to deliver fluid from the plurality of drillings to a central swirl chamber in flow communication with the metering orifice, which delivers the fluid from the injector in the form of a spray;

wherein the plurality of drillings extend at an angle relative to a longitudinal axis from the openings formed in the seating surface to the valve seat lower surface in a continuously linear path through the valve seat to the nozzle plate;

wherein the plurality of swirl channels is formed into the nozzle plate upper surface;

wherein one of the valve seat lower surface or the nozzle plate upper surface includes a registration post formed on a surface of the one of the valve seat lower surface or the nozzle plate upper surface, and another of the valve seat lower surface or the nozzle plate upper surface includes a registration bore configured to receive the registration bore to align the inlet portions of the plurality of swirl channels with the plurality of drillings of the valve seat; and wherein the metering orifice includes an opening formed in a lower surface of the central swirl chamber, a generally conical surface extending from the opening, and an increased diameter outlet surface that terminates at the nozzle plate lower surface.

* * * * *